(12) United States Patent
Akima et al.

(10) Patent No.: US 12,475,742 B2
(45) Date of Patent: Nov. 18, 2025

(54) SERVER AND VEHICLE

(71) Applicant: TOYOTA JIDOSHA KABUSHIKI KAISHA, Toyota (JP)

(72) Inventors: Satoshi Akima, Nagakute (JP); Yukiya Kushibiki, Gifu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

(21) Appl. No.: 18/479,381

(22) Filed: Oct. 2, 2023

(65) Prior Publication Data
US 2024/0257576 A1 Aug. 1, 2024

(30) Foreign Application Priority Data

Jan. 27, 2023 (JP) ................. 2023-011340

(51) Int. Cl.
*G07C 5/00* (2006.01)
*B60Q 1/34* (2006.01)
*G07C 5/02* (2006.01)
*H04W 4/44* (2018.01)

(52) U.S. Cl.
CPC ............. *G07C 5/008* (2013.01); *G07C 5/02* (2013.01)

(58) Field of Classification Search
CPC ........... G07C 5/008; G07C 5/02; H04W 4/44; B60Q 1/346; B60Q 1/40

USPC ........................................................ 701/31.4
See application file for complete search history.

(56) References Cited

U.S. PATENT DOCUMENTS

| 2004/0100373 A1* | 5/2004 | Ponziani | B60Q 1/346 340/476 |
| 2010/0013624 A1* | 1/2010 | Groeller | B60Q 1/42 340/476 |
| 2014/0309855 A1* | 10/2014 | Tran | B60Q 1/346 701/36 |

FOREIGN PATENT DOCUMENTS

| JP | 2012-118916 A | 6/2012 |
| JP | 2015-022499 A | 2/2015 |

* cited by examiner

*Primary Examiner* — Tyler D Paige
(74) *Attorney, Agent, or Firm* — SoraIP, Inc.

(57) ABSTRACT

The control unit of the server acquires first information including a turn indicator operation time, a steering angular velocity, and a vehicle speed when the turn indicator is operated, from the first vehicle. Based on the acquired first information, the control unit of the server determines that the turn indicator operation performed in the first vehicle is an operation for notifying the behavior of the first vehicle and the turn indicator operation time is It is determined whether or not the operation corresponds to a short-time turn indicator, which is an operation that is equal to or less than the first time length.

5 Claims, 5 Drawing Sheets

VEHICLE INFORMATION DB 32

| VEHICLE ID | DATE | TURN INDICATOR OPERATION 1 | | | | ... | TURN INDICATOR OPERATION N | | | |
|---|---|---|---|---|---|---|---|---|---|---|
| | | OPERATING TIME | STEERING ANGULAR VELOCITY | VEHICLE SPEED | FLAG | | OPERATING TIME | STEERING ANGULAR VELOCITY | VEHICLE SPEED | FLAG |
| V0001 | ---- | ---- | ---- | ---- | 1 | ... | ---- | ---- | ---- | 0 |
| ⋮ | ⋮ | ⋮ | ⋮ | ⋮ | ⋮ | ... | ⋮ | ⋮ | ⋮ | ⋮ |

SERVER AND VEHICLE

CROSS-REFERENCE TO RELATED APPLICATION

This application claims priority to Japanese Patent Application No. 2023-011340 filed on Jan. 27, 2023 incorporated herein by reference in its entirety.

BACKGROUND

1. Technical Field

The present disclosure relates to a server and a vehicle.

2. Description of Related Art

There is known a technology for diagnosing skill of a driver in a driving operation for changing lanes when driving a vehicle (e.g., Japanese Unexamined Patent Application Publication No. 2012-118916 (JP 2012-118916 A)).

SUMMARY

An object of the present disclosure is to provide technology that can contribute to improving precision of driving diagnosis.

One aspect of the present disclosure is a server.

The server in this case may, for example, include a control unit that executes acquiring, from a first vehicle, first information relating to turn indicator actuation time, steering angular velocity, and vehicle speed, when a turn indicator operation is performed, and determining, based on the first information, whether the turn indicator operation falls under a short-time turn indicator, in which the turn indicator operation is an operation for forenotice of behavior of the first vehicle and also the turn indicator actuation time is no longer than a first time length.

Another aspect of the present disclosure is a vehicle.

The vehicle in this case may, for example, include a control unit that executes acquiring of first information relating to turn indicator actuation time, steering angular velocity, and vehicle speed, when a turn indicator operation is performed, and determining, based on the first information, whether the turn indicator operation falls under a short-time turn indicator, in which the turn indicator operation is an operation for forenotice of behavior of the vehicle and also the turn indicator actuation time is no longer than a first time length.

The present disclosure can also be understood as being an information processing method in which a computer executes processing of the server or the vehicle above. The present disclosure can also be understood as being a program for causing a computer to execute the above information processing method, or a storage medium that performs non-transitory storage of the program.

According to the present disclosure, technology that can contribute to improving precision of driving diagnosis can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A driving diagnosis system that diagnoses a driving operation of a vehicle by a user is known. In the driving diagnosis system, for example, a method of diagnosing whether the user tends to perform a turn indicator operation corresponding to the turn indicator for a short period of time can be considered.

Here, the turn indicator operation is a driving operation performed to notify the surrounding moving bodies (vehicles, pedestrians, etc.) of the behavior when changing the course of the vehicle (for example, turning left or right or changing lanes). The short-time turn indicator operation is a turn indicator actuation in which the turn indicator actuation time is equal to or less than the first time length (for example, about 2 to 3 seconds) among the above-described turn indicator actuations.

When the turn indicator operation corresponding to the turn indicator is performed for a short time, the time from the start of the turn indicator operation (start of blinking of the direction indicator) to the actual start of the first vehicle's course change is shortened. Therefore, there is a possibility that it may cause inconvenience to surrounding moving bodies or cause a decrease in safety.

By the way, when the turn indicator is erroneously operated, it is assumed that the turn indicator is immediately turned off by the user. In addition, when the first vehicle is stopped or slowed down waiting for a left or right turn, etc., and the steering is performed with the turn indicator activated, the turn indicator is automatically turned off by the function of the cancellation mechanism incorporated in the steering device. There is also a possibility that it will be made. In these cases, there is a possibility that the turn indicator operation time will be less than or equal to the first length of time. Therefore, if it is determined whether the turn indicator operation corresponds to the turn indicator operation for a short period of time based only on the turn indicator operation time, there is a possibility that the diagnostic accuracy related to the turn indicator operation will be low.

In contrast, in the server, which is one aspect of the present disclosure, the control unit acquires the first information from the first vehicle. The first information is information about the turn indicator operation time, the steering angular velocity, and the vehicle speed when the turn indicator is operated in the first vehicle. The control unit determines whether the turn indicator operation corresponds to the short-time turn indicator based on the first information. The "short-time turn indicator" referred to here is an operation for predicting the behavior of the first vehicle, and is an operation in which the turn indicator operation time is equal to or shorter than the first time length. Note that the server according to the present disclosure may acquire the steering angle from the first vehicle instead of the steering angular velocity, and acquire the steering angular velocity by differentiating the acquired steering angle.

Here, the control unit of the server according to the present disclosure determines that the turn indicator operation does not correspond to the short time turn indicator, when the turn indicator operation time is equal to or less than the first time length and the steering angular velocity is equal to or less than the first angular velocity. The "first angular velocity" referred to here is a value that can be determined that, if the steering angular velocity is equal to or less than the first angular velocity, steering (operation to rotate the steering wheel) for changing the course of the first vehicle is not being performed. As a result, a turn indicator operation in which the turn indicator operation time is equal to or less than the first time length and which does not involve steering (changing the course of the first vehicle), such as a turn indicator operation due to a user's erroneous operation, is determined that it does not correspond to the time turn indicator.

Further, the control unit of the server according to the present disclosure determines that the turn indicator operation does not correspond to the short time turn indicator when the turn indicator operation time is equal to or less than the first time length and the vehicle speed is equal to or less than the first speed. The "first speed" referred to here is a value at which it can be determined that the first vehicle is stopped or slowing down if the vehicle speed is equal to or lower than the first speed, and is, for example, about 10 km/h. As a result, it is possible to avoid a turn indicator operation whose turn indicator operation time is equal to or less than the first time length, such as the turn indicator operation when steering is performed while the first vehicle is stopped or slowing down waiting for a right or left turn. A turn indicator operation in which the turn indicator is automatically turned off by a canceling mechanism incorporated in the steering device is determined not to correspond to a short time turn indicator.

Therefore, according to the server according to the present disclosure, it is possible to more accurately determine whether the turn indicator operation corresponds to the short-time turn indicator. As a result, it is possible to improve the accuracy of driving diagnosis related to turn indicator operation.

The first vehicle may determine whether the turn indicator operation performed in the first vehicle corresponds to the short-time turn indicator. That is, the control unit of the first vehicle acquires first information about the turn indicator operation time, the steering angular velocity, and the vehicle speed when the turn indicator is operated, and based on the first information, the turn indicator and determining whether the operation corresponds to the turn indicator for a short period of time. In that case, the result of the determination by the first vehicle may be transmitted to the server, and the server may perform driving diagnosis related to turn indicator operation.

According to the information processing apparatus according to the present disclosure, equipment (first equipment) suitable for assisting the driving operation for reversing the first vehicle can be proposed to the user who tends to park facing forward.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

Embodiment

Figure 1:
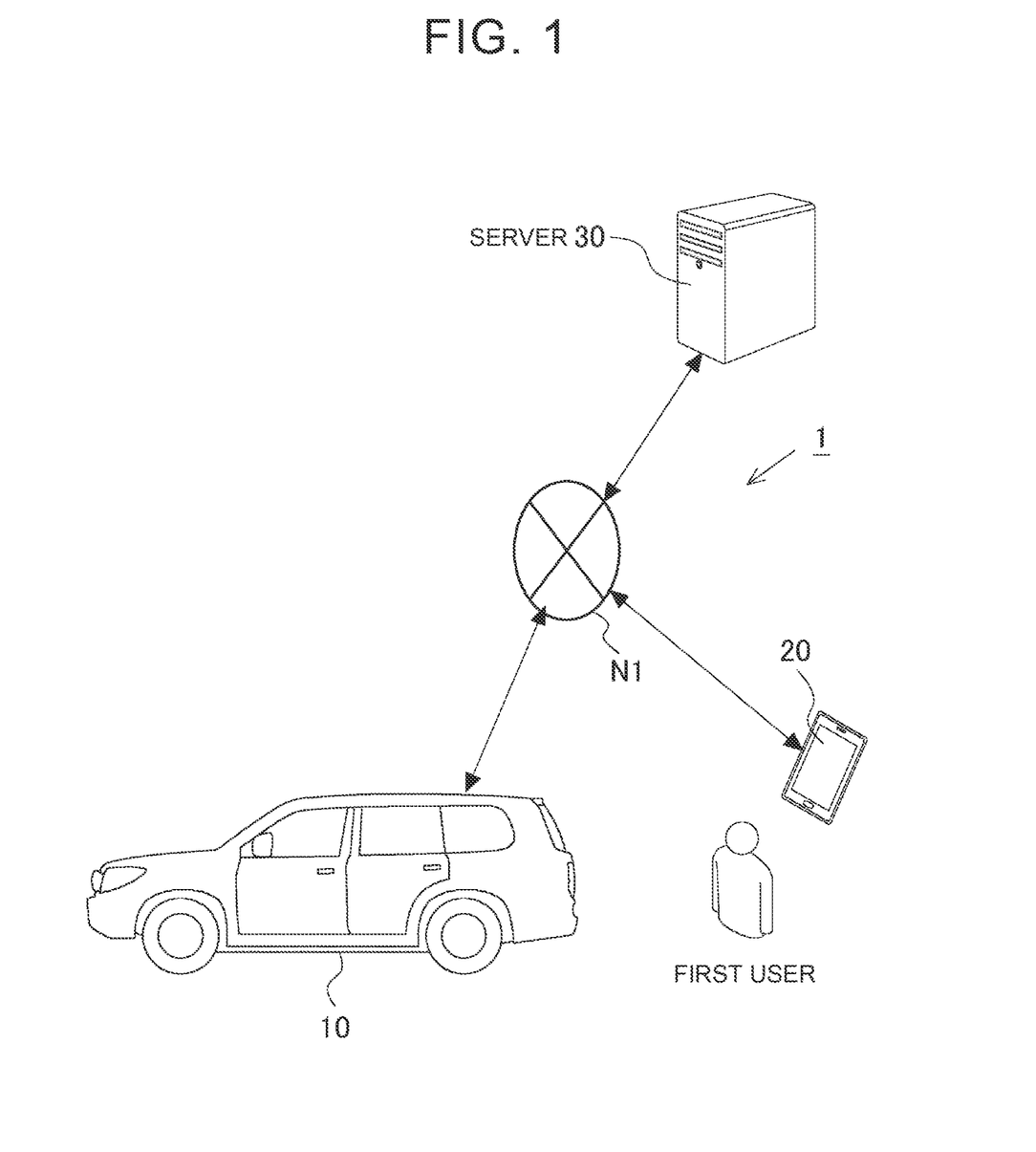
FIG. 1 is a diagram showing a schematic configuration of a system according to an embodiment.

FIG. 1 is a diagram showing a schematic configuration of a system 1 according to the present embodiment. The system 1 is a system that provides a service for diagnosing the driving operation of the first vehicle 10 by the first user and providing the diagnosis result to the first user (hereinafter also referred to as "driving diagnosis service").

In the example of FIG. 1, system 1 includes first vehicle 10, user terminal 20 and server 30. A first vehicle 10 is a vehicle driven by a first user. The user terminal 20 is a terminal used by the first user. The server 30 performs driving diagnosis for the first vehicle 10 and provides the user terminal 20 with the diagnosis result. In this embodiment, the server 30 performs driving diagnosis as to whether the first user tends to turn on the turn indicator for a short time, and provides the user terminal 20 with the diagnosis result. The user terminal 20 presents the diagnosis result provided by the server 30 to the first user.

The first vehicle 10, the user terminal 20 and the server 30 are interconnected by a network N1. The network N1 is, for example, a Wide Area Network (WAN), which is a worldwide public communication network such as the Internet, or another communication network. The network N1 may include a telephone communication network such as a mobile phone and/or a wireless communication network such as Wi-Fi (registered trademark). Note that the first vehicle 10 may be connected to the user terminal 20 via short-range wireless communication. Although one first vehicle 10 is illustrated in FIG. 1 as an example, a plurality of first vehicles 10 may exist. Also, a plurality of user terminals 20 may exist according to the number of first vehicles 10.

System Hardware Configuration

Figure 2:
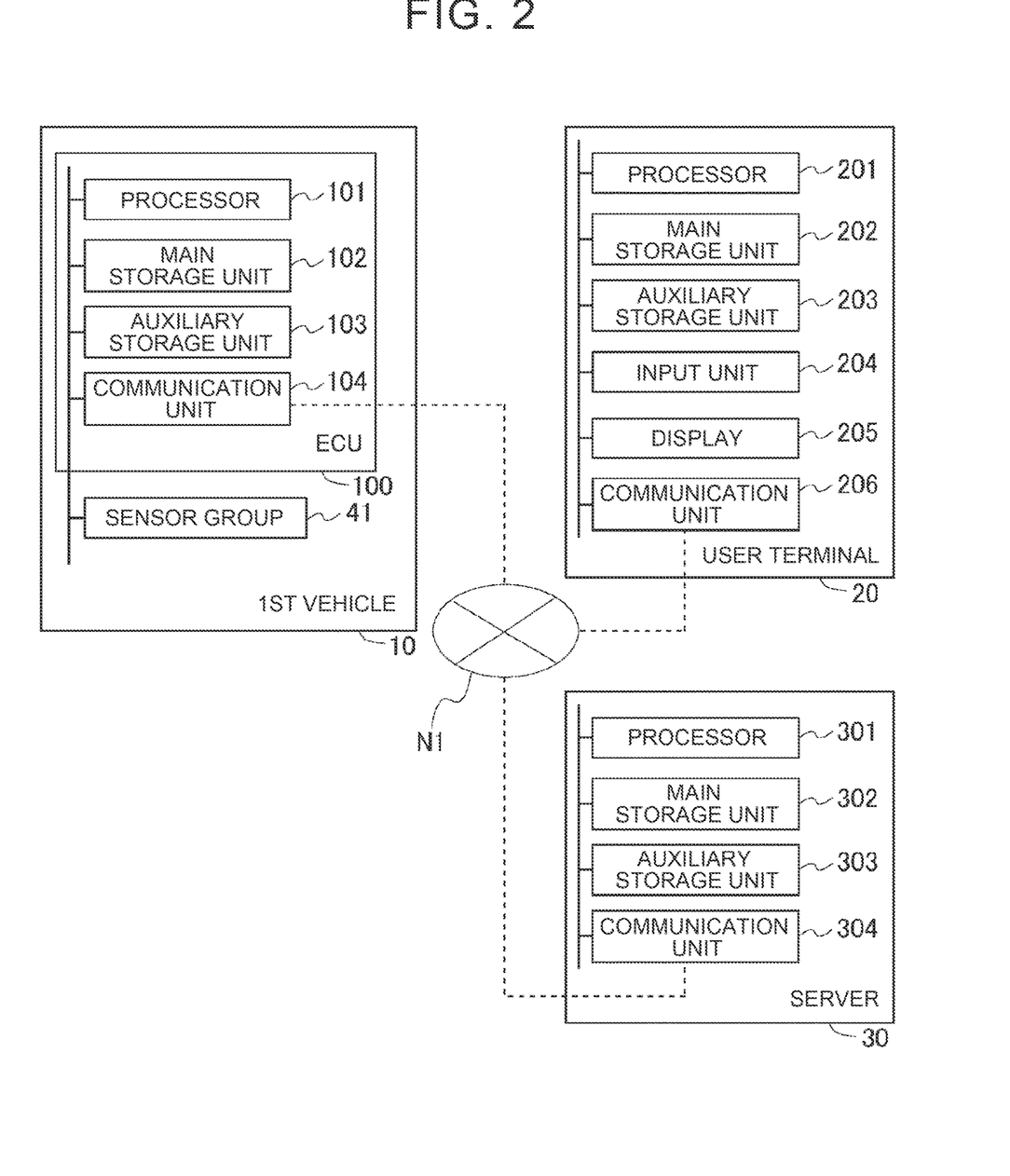
FIG. 2 is a diagram showing a hardware configuration example of each of a first vehicle, a user terminal, and a server included in the system according to the embodiment.

FIG. 2 is a diagram showing an example of the hardware configuration of each of the first vehicle 10, the user terminal 20, and the server 30. In the example shown in FIG. 2, only the hardware configuration related to the driving diagnosis service is extracted and illustrated, but each of the first vehicle 10, the user terminal 20, and the server 30 may include other hardware configuration.

The first vehicle 10 has an ECU 100 and a sensor group 41. These components are interconnected by an in-vehicle network based on standards such as Controller Area Network (CAN), Local Interconnect Network (LIN), or FlexRay. Note that each of these components may be realized by a combination of an in-vehicle device such as a car navigation system or an in-vehicle communication device instead of a single module.

The ECU 100 is a computer mounted on the first vehicle 10. The ECU 100 includes a processor 101, a main storage unit 102, an auxiliary storage unit 103 and a communication unit 104. The components are connected to each other by a bus.

The processor 101 is a Central Processing Unit (CPU), a Digital Signal Processor (DSP), or the like. The processor 101 controls the ECU 100 and performs various information processing operations. The main storage unit 102 includes a random access memory (RAM), a read only memory (ROM), and the like. The auxiliary storage unit 103 includes an Erasable Programmable ROM (EPROM), Hard Disk Drive (HDD), removable media, or the like. The auxiliary storage unit 103 stores an operating system (OS), various programs, various tables, and the like. The processor 101 loads the program stored in the auxiliary storage unit 103 into the work area of the main storage unit 102 and executes it, thereby controlling each component. As a result, the ECU 100 realizes a function that meets a predetermined purpose. The main storage unit 102 and the auxiliary storage unit 103 are computer-readable recording media. Note that part of the information stored in the auxiliary storage unit 103 may be stored in the main storage unit 102. Further, part of the information stored in the main storage unit 102 may be stored in the auxiliary storage unit 103.

The communication unit 104 is an interface for connecting the ECU 100 to the network N1. The communication unit 104 is a mobile communication service (for example, a telephone communication network such as 6th Generation (6G), 5th Generation (5G), 4th Generation (4G), 3rd Generation (3G), or Long Term Evolution (LTE)), Wi-Fi (registered trademark), or a wireless communication network such as Bluetooth (registered trademark) to communicate with other devices (e.g., server 30, etc.) via network N1.

The sensor group 41 includes, for example, sensors that detect the state of the first vehicle 10 and sensors that detect the actions of the driver. The sensor group 41 in the present embodiment includes at least a turn indicator switch sensor (a sensor that detects the switch state of a turn indicator (direction indicator)), a steering angle sensor, and a vehicle speed sensor.

Next, the user terminal 20 is a computer used by the first user. The user terminal 20 is, for example, a smart phone, a mobile phone, a tablet terminal, a personal information terminal, a wearable computer (such as a smart watch), or a personal computer (PC). The user terminal 20 has a processor 201, a main storage unit 202, an auxiliary storage unit 203, an input unit 204, a display 205 and a communication unit 206. The components are connected to each other by a bus. Since the processor 201, the main storage unit 202, the auxiliary storage unit 203, and the communication unit 206 are the same as the processor 101, the main storage unit 102, the auxiliary storage unit 103, and the communication unit 104 of the ECU 100, the description thereof is omitted.

The input unit 204 is a device that receives input operations performed by the first user, and includes, for example, a touch panel, a mouse, a keyboard, a microphone, or push buttons. A display 205 is a device that presents information to the first user, such as a Liquid Crystal Display (LCD) or an Electro luminescence (EL) panel. Note that the input unit 204 and the display 205 may be configured as one touch panel display.

Next, the server 30 is a computer operated by a driving diagnosis service provider. The server 30 has a processor 301, a main storage unit 302, an auxiliary storage unit 303, and a communication unit 304, as shown in FIG. 2. The components are connected to each other by a bus. The processor 301, the main storage unit 302 and the auxiliary storage unit 303 are the same as the processor 101, the main storage unit 102 and the auxiliary storage unit 103 of the ECU 100, so the description thereof will be omitted.

The communication unit 304 of the server 30 is an interface for connecting the server 30 to the network N1. The communication unit 304 includes, for example, a Local Area Network (LAN) interface board or a wireless communication circuit for wireless communication. In this embodiment, the communication unit 304 communicates with the first vehicle 10 and the user terminal 20 through the network N1.

Functional Configuration of the System

Figure 3:
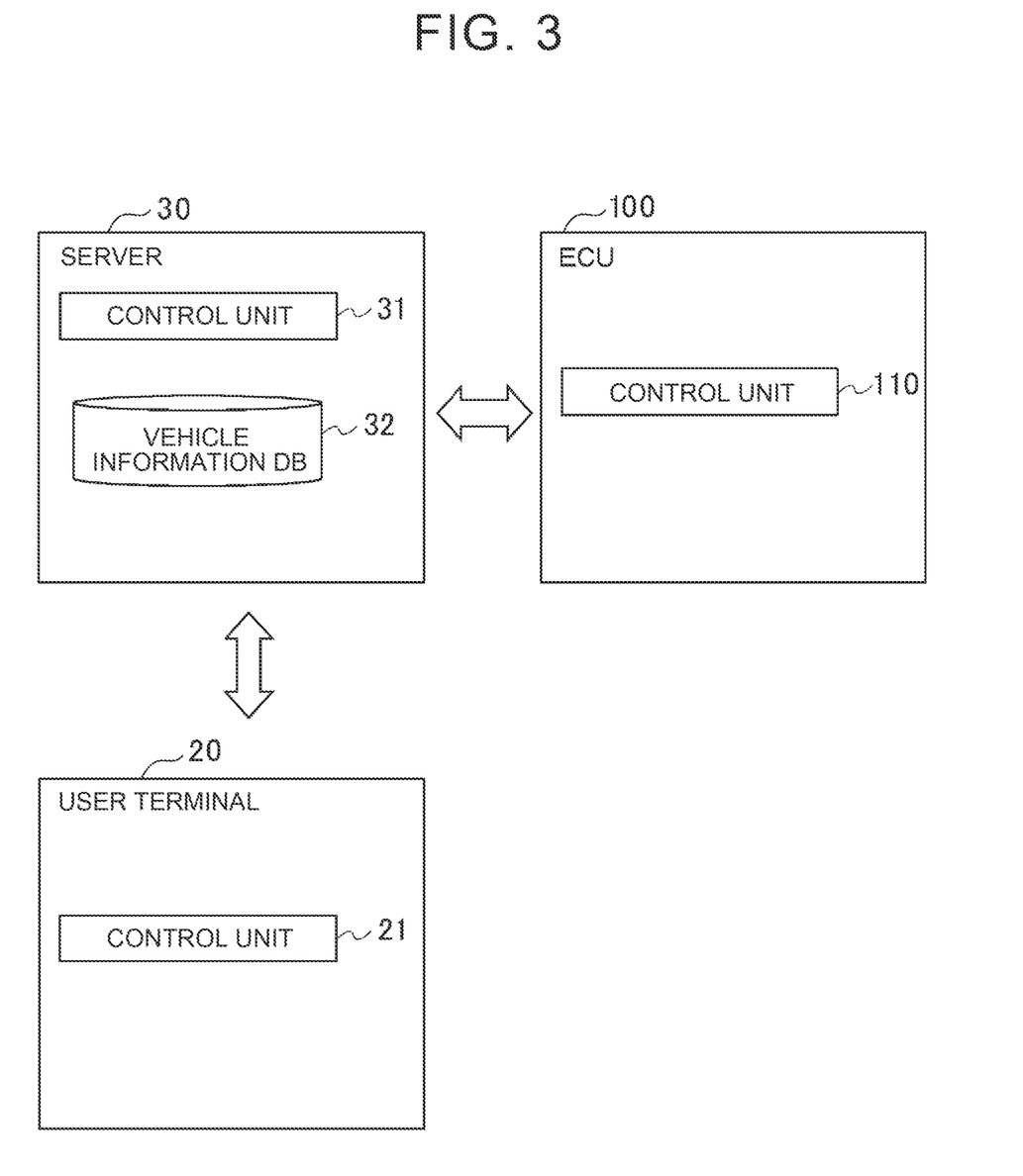
FIG. 3 is a block diagram showing an example of functional configurations of an ECU, a user terminal, and a server according to the embodiment.

A functional configuration of the system 1 according to this embodiment will be described. FIG. 3 is a block diagram showing an example of functional configurations of each of the ECU 100, the user terminal 20, and the server 30. The functional configurations of the ECU 100, the user terminal 20, and the server 30 are not limited to the configurations illustrated in FIG. 3, and functional components can be omitted, changed, or added as appropriate.

As shown in FIG. 3, the ECU 100 has a control unit 110 as its functional component. Control unit 110 is achieved by processor 101 of ECU 100 executing a program stored in auxiliary storage unit 103. Note that the control unit 110 may be achieved by a hardware circuit such as an Application Specific Integrated Circuit (ASIC) or a Field Programmable Gate Array (FPGA).

The control unit 110 of the ECU 100 in this embodiment transmits travel information to the server 30 through the communication unit 104 each time the first vehicle 10 finishes traveling for one trip. The travel information includes, for example, the date and time of the trip, the turn indicator activation time during the trip (the length of time from when the turn indicator switch is turned on until it is turned off), the steering angle during the turn indicator activation period (the steering angle during the turn indicator operation), the turn indicator It is information including the vehicle speed during the operation period (vehicle speed during turn indicator operation), information (vehicle ID) for identifying the first vehicle 10, and the like, and is an example of "first information" according to the present disclosure. Further, the "trip" here is a period from when the first vehicle 10 is operated (for example, the ignition switch is turned on) to when it is turned off (for example, the ignition switch is turned off).

The user terminal 20, as shown in FIG. 3, has a control unit 21 as its functional component. The control unit 21 is achieved by executing a program stored in the auxiliary storage unit 203 by the processor 201 of the user terminal 20. Note that the control unit 21 may be achieved by a hardware circuit such as an Application Specific Integrated Circuit (ASIC) or a Field Programmable Gate Array (FPGA).

The control unit 21 of the user terminal 20 in this embodiment presents the diagnosis result provided from the server 30 to the first user. Specifically, when the communication unit 206 of the user terminal 20 receives the diagnosis result transmitted from the server 30, the control unit 21 displays the diagnosis result on the display 205 of the user terminal 20.

Next, the functional configuration of the server 30 will be described. As shown in FIG. 3, the server 30 in this embodiment has a control unit 31 and a vehicle information DB 32 as its functional components.

Control unit 31 is achieved by processor 301 of server 30 executing a program stored in auxiliary storage unit 303. Note that the control unit 31 may be achieved by a hardware circuit such as an Application Specific Integrated Circuit (ASIC) or a Field Programmable Gate Array (FPGA).

The control unit 31 receives, through the communication unit 304, the travel information transmitted from the ECU 100 each time the first vehicle 10 finishes traveling for one trip. As described above, the travel information includes the date and time of the trip, the turn indicator operation time during the trip, the steering angle during the turn indicator operation period, the vehicle speed during the turn indicator operation period, and the information (vehicle ID) that identifies the first vehicle 10.

Each time the control unit 31 receives travel information transmitted from the ECU 100, it determines whether each turn indicator operation performed during a trip corresponding to the travel information corresponds to a short-time turn indicator. Specifically, the control unit 31 determines whether the turn indicator operation time of each turn indicator operation is equal to or less than the first time length. The "first length of time" referred to here means a time length (for example, about 2 to 3 seconds) predicted to cause trouble to the surrounding moving bodies (vehicles, pedestrians, etc.) or deteriorate the safety, when the turn indicator operation time for the first vehicle 10 to change course becomes equal to or less than the first length of time.

When it is determined that the turn indicator operation time is equal to or shorter than the first time length, the control unit 31 differentiates the steering angle during the turn indicator operation period of the turn indicator actuation, thereby calculating the steering angular velocity during the turn indicator operation period. Here, the speed (steering angular velocity) at which the first user rotates the steering wheel during the turn indicator operation period is not always constant. In that case, the steering angular velocity during the turn indicator operation period can take multiple values. Therefore, in the present embodiment, the control unit 31 extracts the maximum steering angular velocity among a plurality of steering angular velocities during the turn indicator operation period. The control unit 31 determines whether the extracted steering angular velocity is equal to or less than the first angular velocity. The "first angular velocity" referred to here means a value at which that steering for changing the course of the first vehicle 10 (operation to rotate the steering wheel) is not performed if the steering angular velocity is equal to or less than the first angular velocity, and a value that is set in advance based on the results of experiments, simulations, or the like. Note that the control unit 31 may obtain an average value of a plurality of steering angular velocities during the turn indicator operation period and determine whether the average value is equal to or less than the first angular velocity.

If the steering angular velocity during the turn indicator operation period is less than or equal to the first angular velocity, it can be considered that the steering for changing the course of the first vehicle 10 was not performed during the turn indicator operation period. Therefore, if the turn indicator operation time is less than or equal to the first time length and the steering angular velocity during the turn indicator operation period is less than or equal to the first angular velocity, after the turn indicator switch is turned on by the first user's erroneous operation, it is likely that the first user immediately turned off the turn indicator switch. Therefore, the control unit 31 in the present embodiment determines, regarding the turn indicator operation determined that the turn indicator operation time is equal to or less than the first time length and the steering angular velocity during the turn indicator operation period is equal to or less than the first angular velocity, that it does not correspond to a short-time turn indicator.

When it is determined that the steering angular velocity during the turn indicator operation period is greater than the first angular velocity, the control unit 31 determines whether the vehicle speed during the turn indicator operation period of the turn indicator operation is equal to or less than the first speed. The "first speed" referred to here is a value at which it can be determined that the first vehicle 10 is stopped or slowing down if the vehicle speed of the first vehicle 10 is equal to or lower than the first speed, for example, about 10 km/h. It should be noted that the vehicle speed is not always constant during the turn indicator operation period. In that case, the speed during the turn indicator operation period can take multiple values. Therefore, in the present embodiment, the control unit 31 extracts the maximum vehicle speed from among multiple vehicle speeds during the turn indicator operation period, and determines whether the extracted vehicle speed is equal to or lower than the first speed.

When the turn indicator operation time is equal to or less than the first time length, the steering angular velocity during the turn indicator activation period is greater than the first angular velocity, and the vehicle speed during the turn indicator activation period is equal to or less than the first speed, It can be assumed that the turn indicator switch is automatically turned off by the operation of the canceling mechanism incorporated in the steering device when the steering is performed while the vehicle 10 of No. 1 is stopped or slowing down waiting for a left or right turn or the like. Therefore, the control unit 31 in the present embodiment is configured so that the turn indicator operation time is equal to or shorter than the first time length, the steering angular velocity during the turn indicator operation period is greater than the first angular velocity, and the vehicle speed during the turn indicator operation period is A turn indicator operation that is determined to be at or below the first speed is determined not to correspond to a short-time turn indicator.

Regarding turn indicator operation, the turn indicator operation time is equal to or less than the first length of time, the steering angular velocity during the turn indicator operation period is greater than the first angular velocity, and the vehicle speed during the turn indicator operation period is greater than the first speed, the control unit 31 determines that it corresponds to the short time turn indicator.

After determining whether each turn indicator operation performed during the trip corresponds to a short turn indicator, the control unit 31 registers the determination result in the vehicle information DB 32 described later. As a result, the control unit 31 can perform a driving diagnosis targeting the turn indicator operation performed during the trip, based on the information registered in the vehicle information DB 32. The control unit 31 can also transmit the driving diagnosis result to the user terminal 20 through the communication unit 304. Note that the diagnostic method for driving diagnosis is not limited to a specific method. For example, as a diagnostic method for driving diagnosis, a method may be adopted in which the evaluation value for turn indicator operation decreases as the number of short-time turn indicators performed during the trip increases.

Next, the vehicle information DB 32 of the server 30 will be explained. Vehicle information DB 32 is a database constructed in auxiliary storage unit 303 of server 30 by processor 301 of server 30 executing a database management system (DBMS) program. Vehicle information DB 32 may be constructed as a relational database.

Figure 4:
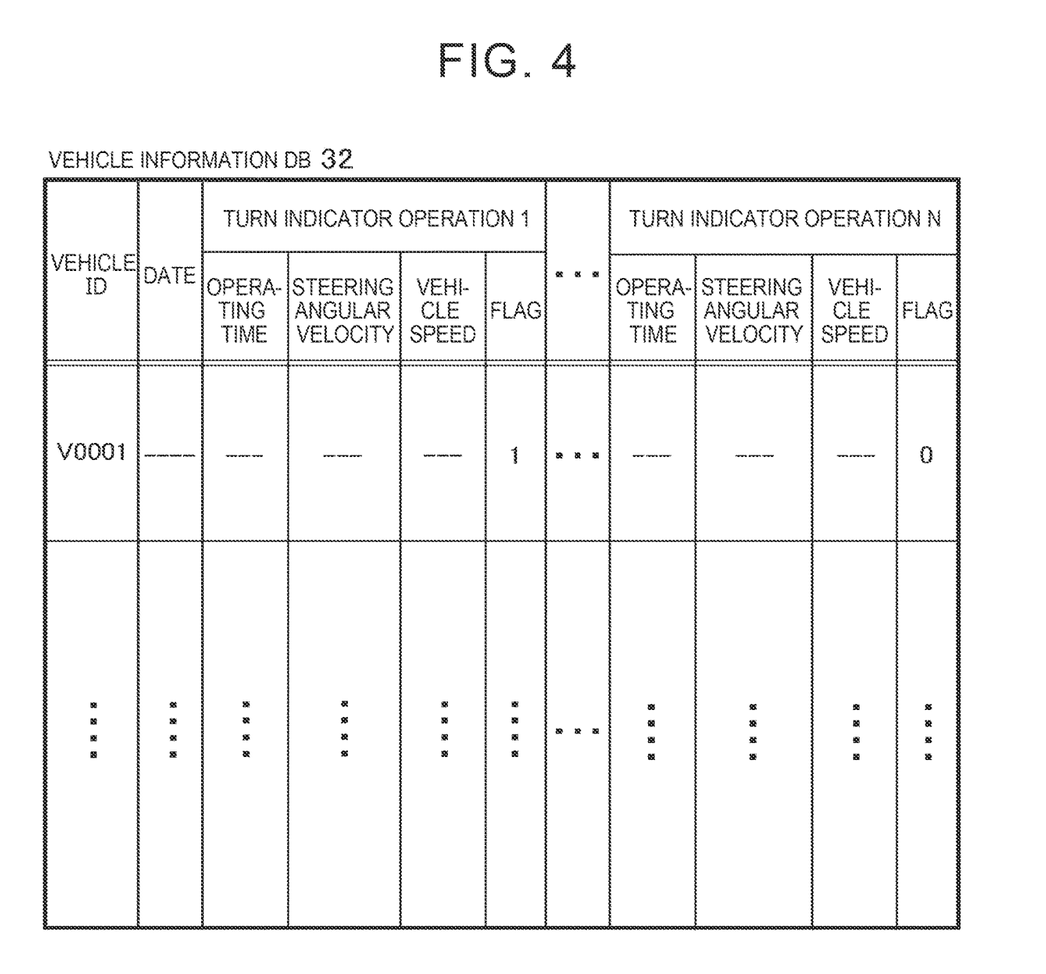
FIG. 4 is a diagram showing an example of information stored in the vehicle information DB according to this embodiment.

Vehicle information DB 32 in this embodiment stores the information regarding the turn indicator operation performed during the trip for every vehicle. FIG. 4 is a diagram showing an example of information stored in the vehicle information DB 32 in this embodiment. As shown in FIG. 4, the vehicle information DB 32 in this embodiment has a record for each vehicle (hereinafter also referred to as "vehicle information record"). Each vehicle information record has a vehicle ID field, a date field, and a turn indicator operation field, as shown in FIG. 4. In addition, when the turn indicator operation is performed a plurality of times (N times in the example of FIG. 4) in each trip, the turn indicator operation field of the same number as the number of times (N times in the example of FIG. 4) is set to the vehicle information record.

In the vehicle ID field of the vehicle information record, information (vehicle ID) for identifying each of the plurality of first vehicles 10 targeted for the driving diagnosis service is registered. The date of the trip of each first vehicle 10 is registered in the date field. The turn indicator operation field is divided into subfields of operation time, steering angular velocity, vehicle speed, and flag. The operation time field registers the turn indicator operation time for each turn indicator operation. The steering angular velocity field registers the steering angular velocity in each turn indicator operation. The information registered in the steering angular velocity field is the maximum steering angular velocity among a plurality of steering angular velocities during the turn indicator operation period of each turn indicator operation. Such a steering angular velocity is acquired by the control unit 31 as described above. The vehicle speed field registers the vehicle speed of the first vehicle 10 during the turn indicator operation period of each turn indicator operation. The information registered in the vehicle speed field is the maximum vehicle speed among a plurality of vehicle speeds during the turn indicator operation period of each turn indicator operation. Such vehicle speed is acquired by the control unit 31 as described above. Information for identifying whether each turn indicator operation corresponds to a short-time turn indicator is registered in the flag field. For example, "1" is registered in the flag field for a turn indicator operation corresponding to a short-time turn indicator. In addition, "0" is registered in the flag field for turn indicator operations that do not correspond to short-time turn indicators. Information registered in the flag field is determined according to the determination result by the ECU 100.

Processing Flow

Figure 5:
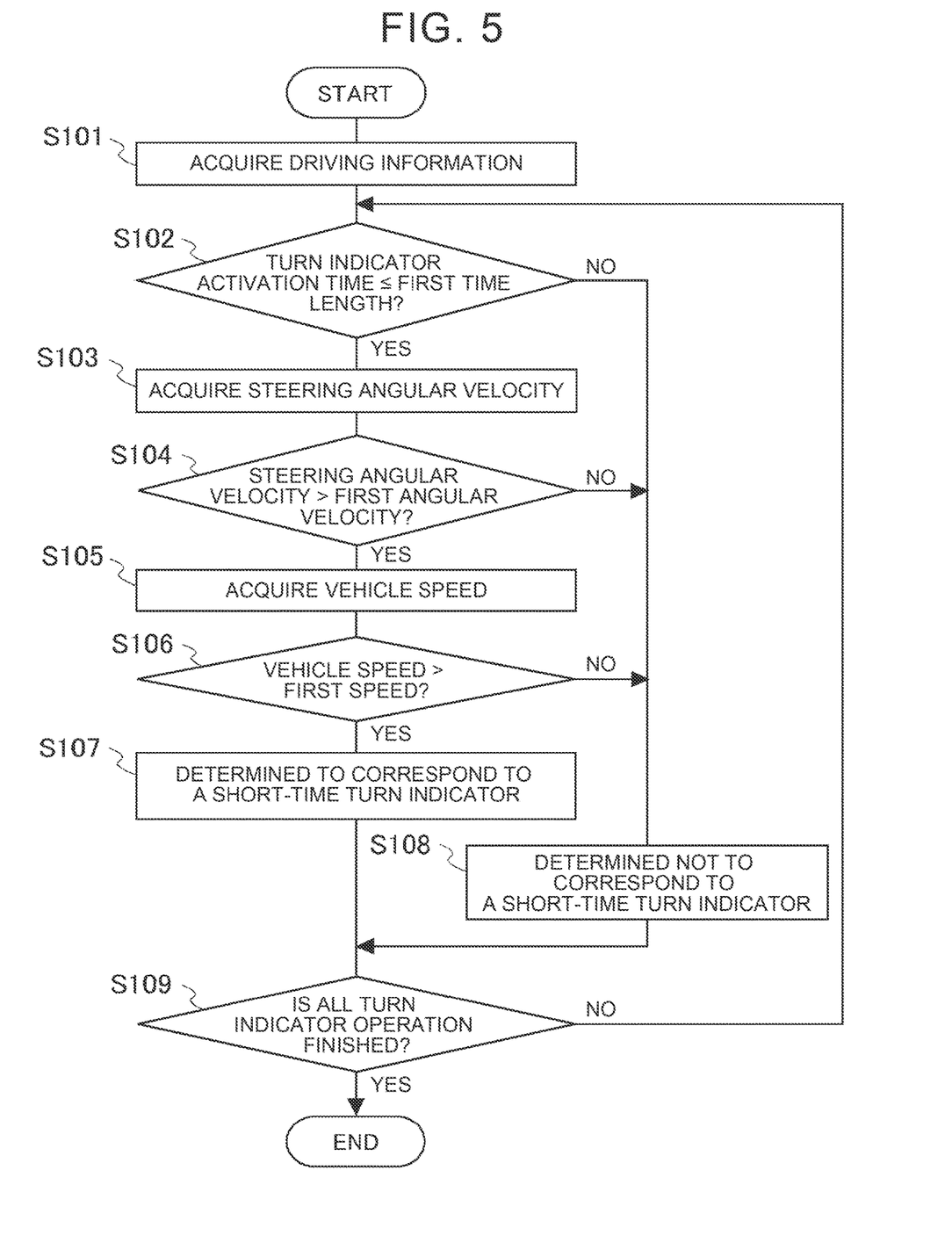
FIG. 5 is a flowchart illustrating an example of a processing routine executed by the server according to the embodiment.

Next, the flow of processing executed by the server 30 will be described with reference to FIG. 5. FIG. 5 is a flowchart showing a processing routine executed by the server 30 each time travel information transmitted from the ECU 100 of the first vehicle 10 is received. Although the execution subject of the processing routine shown in FIG. 5 is the processor 301 of the server 30, the functional component (control unit 31) of the server 30 will be described here as the execution subject.

In FIG. 5, when travel information transmitted from the ECU 100 of the first vehicle 10 is received by the communication unit 304 of the server 30, the travel information is transferred from the communication unit 304 to the control unit 31. Thereby, the control unit 31 acquires the travel information through the communication unit 304 (S101). After finishing executing the process of S101, the control unit 31 executes the process of S102.

It should be noted that the processing from S102 to S108 in FIG. 5 is executed for all turn indicator operations performed during the trip that is the object of the travel information. First, in S102, the control unit 31 determines whether the turn indicator operation time of the target turn indicator actuation is equal to or shorter than the first length of time. As described above, the first length of time is such that when the turn indicator activation time when the first vehicle 10 changes course becomes equal to or less than the first length of time, it may cause inconvenience to surrounding moving bodies, or It is a length of time (for example, about 2 to 3 seconds) that is expected to cause a decrease in safety. When it is determined that the turn indicator operation time of the target turn indicator actuation is equal to or shorter than the first time length (affirmative determination in S102), the control unit 31 executes the process of S103.

In S103, the control unit 31 acquires the steering angular velocity during the turn indicator operation period of the target turn indicator operation. Specifically, the control unit 31 calculates the steering angular velocity by differentiating the steering angle included in the travel information (the steering angle during the turn indicator operation period of the target turn indicator actuation). The control unit 31 acquires the maximum steering angular velocity among the calculated steering angular velocities as the steering angular velocity of the target turn indicator operation. After finishing executing the process of S103, the control unit 31 executes the process of S104.

In S104, the control unit 31 determines whether the steering angular velocity acquired in S103 is greater than the first angular velocity. As described above, the first angular velocity is a value at which it can be determined that steering for changing the course of the first vehicle 10 is not being performed if the steering angular velocity is equal to or less than the first angular velocity. When the steering angular velocity acquired in S103 is greater than the first angular velocity (affirmative determination in S104), the control unit 31 executes the process of S105.

In S105, the control unit 31 acquires the vehicle speed during the turn indicator operation period of the target turn indicator operation. Specifically, the control unit 31 acquires the maximum vehicle speed among the vehicle speeds included in the travel information (vehicle speed during the turn indicator operation period of the target turn indicator operation) as the vehicle speed of the target turn indicator operation. After finishing executing the process of S105, the control unit 31 executes the process of S106.

In S106, the control unit 31 determines whether the vehicle speed acquired in S105 is higher than the first speed. As described above, the first speed is a value at which it can be determined that the first vehicle 10 is stopped or slowing down if the vehicle speed of the first vehicle 10 is equal to or lower than the first speed. When the vehicle speed acquired in S105 is higher than the first speed (affirmative determination in S106), the control unit 31 executes the process of S107.

In S107, the control unit 31 determines that the target turn indicator operation corresponds to the short-time turn indicator.

In addition, if a negative determination is made in S102 (if the turn indicator operation time is longer than the first time length), if a negative determination is made in S104 (if the steering angular velocity is equal to or less than the first angular velocity), and if S106 is negative (when the vehicle speed is equal to or lower than the first speed), the control unit 31 executes the process of S108. In S108, the control unit 31 determines that the target turn indicator operation does not correspond to the short-time turn indicator.

After completing the processing of S107 or S108, the control unit 31 executes the processing of S109. In S109, the control unit 31 determines whether or not the processes from S102 to S108 have been executed for all turn indicator operations performed during the trip that is the target of the travel information. If the processing from S102 to S108 has not been completed for all the turn indicator operations performed during the trip that are the target of the travel information (negative determination in S109), the control unit 31 performs the following turn indicator operation, S102 to S108 are executed. In addition, when the processing of S102 to S108 has been completed for all turn indicator operations performed during the trip that is the target of travel information (affirmative determination in S109), the control unit 31 ends the execution of this processing routine.

After finishing executing the processing routine in FIG. 5, the control unit 31 generates a vehicle information record as illustrated in FIG. 4 and registers the generated vehicle information record in the vehicle information DB 32. At that time, "1" is registered in the flag field for the turn indicator operation determined to correspond to the short-time turn indicator, and "0" is registered to the flag field for the turn indicator operation determined not to correspond to the short-term turn indicator. By referring to the vehicle information record registered in this way, the control unit 31 can perform driving diagnosis related to the turn indicator operation.

Actions and Effects of the Embodiment

In the present embodiment, a turn indicator operation in which the turn indicator operation time is less than or equal to the first length of time and the steering angular velocity is less than or equal to the first angular velocity is determined not to correspond to the short-time turn indicator. As a result, it is possible to determine that a turn indicator operation that does not involve steering (a change in the course of the first vehicle 10), such as a turn indicator operation due to an erroneous operation by the first user, does not correspond to a short-time turn indicator.

Further, in the present embodiment, the turn indicator operation in which the turn indicator operation time is less than or equal to the first time length, the steering angular velocity is greater than the first angular velocity, and the vehicle speed is less than or equal to the first velocity is performed for a short period of time. It is determined that it does not correspond to the turn indicator. As a result, the turn indicator is automatically turned off by the function of the canceling mechanism incorporated in the steering device, similar to the turn indicator operation when steering is performed while the first vehicle 10 is stopped or slowing down waiting for a right or left turn. It can be determined that the turn indicator operation that is turned off for a short time does not correspond to the turn indicator for a short time.

Therefore, according to the present embodiment, it is possible to more accurately determine whether the turn indicator operation corresponds to the short-time turn indicator. As a result, it is also possible to improve the diagnostic accuracy of the driving diagnosis targeting the turn indicator operation.

Modified Examples

In the above-described embodiment, an example in which the server 30 determines whether the turn indicator operation performed by the first user corresponds to the short-time turn indicator is described, but the determination may be performed in the first vehicle 10 (ECU 100). That is, part of the processing of the control unit 31 of the server 30 may be performed by the control unit 110 of the ECU 100. In that case, each time the first vehicle 10 finishes traveling for one trip, the control unit 110 of the ECU 100 determines whether each turn indicator operation performed during the trip corresponds to a short turn indicator operation, and performs the above-described operation such that data corresponding to the vehicle information record is generated. Control unit 110 of ECU 100 may transmit the generated data to server 30 through communication unit 104. In the server 30 that has received the data from the ECU 100, the control unit 31 may generate a vehicle information record and register it in the vehicle information DB 32 based on the data. As a result, the control unit 31 of the server 30 can refer to the vehicle information record of the vehicle information DB 32 to perform driving diagnosis targeting the first user's turn indicator operation.

Others

The above-described embodiments are merely examples, and the present disclosure may be appropriately modified and implemented without departing from the scope thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration for implementing each function.

What is claimed is:

1. A server, comprising:
a processor;
a wireless communication circuit configured to communicate with an electronic control unit (ECU) of a vehicle and a user terminal through a network; and
a memory, wherein:
the processor is programmed to
acquire, via the wireless communication circuit from the ECU, a turn indicator actuation time, a steering angular velocity, and a vehicle speed of the vehicle, in a case where a turn indicator operation is performed during a trip,
extract a maximum steering angular velocity and a maximum vehicle speed of the vehicle from among the acquired steering angular velocity and the acquired vehicle speed during the turn indicator operation,
determine, based on the turn indicator actuation time, the maximum steering angular velocity, and the maximum vehicle speed, whether the turn indicator operation falls under a short-time turn indicator predicting behavior of the vehicle, in which the turn indicator actuation time is no longer than three seconds,
count the number of the short-time turn indicators during the trip,
register the number of the short-time turn indicators in the memory,
perform driving diagnosis related to the turn indicator operation based on the registered number of the short-time turn indicators, and
transmit, via the wireless communication circuit, a result of the driving diagnosis to the user terminal.

2. The server according to claim 1, wherein;
the processor is further programmed to determine that the turn indicator operation does not fall under the short-time turn indicator in response to the maximum steering angular velocity being no greater than a first angular velocity even though the turn indicator actuation time being no longer than three seconds.

3. The server according to claim 2, wherein:
the processor is further programmed to determine that the turn indicator operation does not fall under the short-time turn indicator in response to the maximum vehicle speed being no greater than a first speed even though the turn indicator actuation time being no longer than three seconds.

4. The server according to claim 1, wherein:
the processor is further programmed to calculate the steering angular velocity by differentiating a steering angle detected by a steering angle sensor of the vehicle.

5. The server according to claim 1, wherein:
the trip is a period from when an ignition switch of the vehicle is turned on to when the ignition switch is turned off.

\* \* \* \* \*